United States Patent
Liu et al.

(10) Patent No.: US 9,216,376 B2
(45) Date of Patent: Dec. 22, 2015

(54) SYSTEMS AND METHODS FOR EXHAUST GAS CLEANING AND/OR BALLAST WATER TREATMENT

(75) Inventors: Ming Liu, Singapore (SG); Nirmal Raman Gurunthalingam, Singapore (SG); Prapisala Thepsithar, Singapore (SG); Wen Sin Chong, Singapore (SG); Kok Seng Foo, Singapore (SG)

(73) Assignee: KEPPEL OFFSHORE & MARINE TECHNOLOGY CENTRE PTE LTD, Singapore (SG)

( * ) Notice: Subject to any disclaimer, the term of this patent is extended or adjusted under 35 U.S.C. 154(b) by 201 days.

(21) Appl. No.: 14/006,163

(22) PCT Filed: Mar. 22, 2012

(86) PCT No.: PCT/SG2012/000095
§ 371 (c)(1),
(2), (4) Date: Nov. 8, 2013

(87) PCT Pub. No.: WO2012/128721
PCT Pub. Date: Sep. 27, 2012

(65) Prior Publication Data
US 2014/0060323 A1   Mar. 6, 2014

Related U.S. Application Data

(60) Provisional application No. 61/466,205, filed on Mar. 22, 2011, provisional application No. 61/536,286, filed on Sep. 19, 2011.

(51) Int. Cl.
*B01D 47/06*   (2006.01)
*B01D 53/14*   (2006.01)
(Continued)

(52) U.S. Cl.
CPC .......... *B01D 53/1481* (2013.01); *B01D 47/06* (2013.01); *B01D 47/12* (2013.01);
(Continued)

(58) Field of Classification Search
CPC ...... B01D 47/00; B01D 47/022; B01D 47/06; B01D 47/12
USPC .............. 95/149, 187, 232, 235; 423/243.01
See application file for complete search history.

(56) References Cited

U.S. PATENT DOCUMENTS

| 4,337,230 A | 6/1982 | Ellestad et al. |
| 4,804,523 A | 2/1989 | Abrams et al. |

(Continued)

FOREIGN PATENT DOCUMENTS

| EP | 0295908 A2 | 12/1988 |
| JP | 52-128886 | 10/1977 |
| WO | WO 2010/104989 A1 | 9/2010 |

OTHER PUBLICATIONS

International Search Report for PCT/SG2012/000095 mailed Oct. 19, 2012.
(Continued)

*Primary Examiner* — Robert A Hopkins
(74) *Attorney, Agent, or Firm* — Roberts Mlotkowski Safran & Cole, P.C.

(57) ABSTRACT

Embodiments of the present invention relate to a system and method for efficient removal of sulfur oxides (SOx), nitrogen oxides (NOx) and particulate matter (PM) contained in an exhaust gas generated from fuel combustion and efficient treatment of water containing microorganizms (e.g. ballast water).

15 Claims, 4 Drawing Sheets

(51) Int. Cl.
*B01D 47/12* (2006.01)
*B01D 53/50* (2006.01)
*B01D 53/75* (2006.01)
*B01D 53/92* (2006.01)
*B01D 53/96* (2006.01)
*C02F 1/467* (2006.01)
*B01D 53/34* (2006.01)
*B01D 53/56* (2006.01)
*C02F 103/00* (2006.01)

(52) U.S. Cl.
CPC .............. *B01D 53/501* (2013.01); *B01D 53/75* (2013.01); *B01D 53/92* (2013.01); *B01D 53/965* (2013.01); *C02F 1/4672* (2013.01); *C02F 1/4674* (2013.01); *B01D 53/346* (2013.01); *B01D 53/56* (2013.01); *B01D 2251/108* (2013.01); *B01D 2251/30* (2013.01); *B01D 2251/304* (2013.01); *B01D 2251/40* (2013.01); *B01D 2251/602* (2013.01); *B01D 2251/604* (2013.01); *B01D 2251/606* (2013.01); *B01D 2251/608* (2013.01); *B01D 2259/4566* (2013.01); *C02F 2103/008* (2013.01); *C02F 2209/001* (2013.01); *C02F 2209/04* (2013.01); *C02F 2209/06* (2013.01); *C02F 2303/24* (2013.01)

(56) References Cited

U.S. PATENT DOCUMENTS

| | | | | |
|---|---|---|---|---|
| 5,690,899 | A | * | 11/1997 | Makkinejad et al. .... 423/243.01 |
| 6,773,611 | B2 | | 8/2004 | Perlich et al. |
| 7,244,348 | B2 | | 7/2007 | Fernandez et al. |
| 8,137,444 | B2 | | 3/2012 | Farsad et al. |
| 2004/0099608 | A1 | | 5/2004 | Leffler et al. |

OTHER PUBLICATIONS

International Preliminary Report on Patentability for PCT/SG2012/000095 mailed Sep. 24, 2013.
Written Opinion for PCT/SG2012/000095 mailed Sep. 22, 2013.

* cited by examiner

SYSTEMS AND METHODS FOR EXHAUST GAS CLEANING AND/OR BALLAST WATER TREATMENT

CROSS REFERENCE TO RELATED APPLICATIONS

This is a US national stage application of PCT/SG2012/000095 filed Mar. 22, 2012, which claims priority to U.S. Provisional Application No. 61/536,286, filed Sep. 19, 2011, and U.S. Provisional Application No. 61/466,205, filed Mar. 22, 2011, the entireties of which are incorporated by reference.

TECHNICAL FIELD

Embodiments of the present invention relate to systems and methods for treatment of exhaust gas and for disinfection of water. Embodiments of the invention are capable of efficient removal of sulfur oxides ($SO_x$), nitrogen oxides ($NO_x$) and particulate matter (PM) contained in the exhaust gas generated from fuel combustion and it is also capable of efficient treatment of water containing microorganisms (e.g. ballast water).

BACKGROUND OF THE INVENTION

Ocean-going vessels (e.g. oil tankers, bulk carriers, container carriers and offshore support vessels) play an indispensible role in the globalised world for transporting freight between markets and for supporting offshore oil and gas exploration and production activities in energy sector. From the global growth of marine industry, it is projected that ocean-going vessels will become a significant source of pollution in the near future. These include oily sludge, hazardous substances, wastewater, garbage, atmospheric emissions and ballast water. Presently, challenges encountering the marine industry include the implementation of upcoming regulations, resulting in the pressure, particularly, to reduce the atmospheric pollutants and to treat ballast water produced from ships.

At the international level, atmospheric emissions from ships are regulated under Annex VI of the International Convention for the Prevention of Pollution from Ship (MARPOL 73/78) set by International Maritime Organization (IMO). Annex VI applies to all ships of 400 gross tonnages (GT) and above and to fixed and floating drilling rigs and other platforms with exemption of emissions from sea-bed mining activities, i.e. exploration, exploitation and associated offshore processing of sea-bed mineral resources. Provision of Annex VI covers three major gaseous pollutants produced from diesel: engines, i.e. $SO_x$, $NO_x$ and PM and the standards are divided into two sets, i.e. global requirement and more stringent requirement in Emission Control Area (ECA).

The emission of $SO_x$ is regulated through the content of sulfur in fuel oil used onboard ships; The most stringent regulation on $SO_x$ and PM appears to be in Year 2015 (Sulfur<0.1% w/w) for ECA and in Year 2020 (Sulfur<0.5% w/w) globally. To comply with the requirement, ship owners must either switch to fuel with low sulfur content or instigate cleaning of the ship's exhaust gases. Due to the potential fluctuation of low sulfur fuel cost, the latter option is most likely to be more viable.

SOx Removal

A process for $SO_x$ removal from flue gas, referred to as desulfurization, can be classified into two techniques, i.e. wet and dry scrubbing methods.

Wet scrubbers are usually applied for $SO_x$ removal from flue gas with the utilization of basic scrubbing agents (i.e. seawater or alkaline substances dissolved in freshwater). The $SO_x$ containing exhaust gas is brought into a scrubber in full contact with the scrubbing agents; it is captured by neutralization mechanism and converted to sulphite or bisulphite forms in the scrubbing liquid phase. The spent seawater after absorption is then aerated and further neutralized so that it can be returned to the sea without damaging to the marine environment. Since this technology relies only on the alkalinity of seawater obtained and the amount of scrubbing water is reversely proportional to seawater alkalinity, the variation of seawater conditions will affect tremendously the removal efficiency of $SO_2$ from exhaust gas. For example in Baltic sea ECA, the seawater alkalinity varies from 500 μmol/kg to 2200 μmol/kg, which means that a seawater scrubber must be able to take in four times more seawater flow if it is designed at normal seawater alkalinity (2200~2400 μmol/kg) level, which is extremely difficult for practical implementation. Furthermore, high amount of seawater flow to the scrubber induces significant back pressure to the exhaust line, creating a high risk of stalling the main engine.

Based on the above consideration, it is obvious that reducing the scrubbing sea water flow rate is critical. Unfortunately, at natural seawater conditions (where there is no dilution from river and rainfall) the alkalinity of seawater is too low to achieve satisfactory $SO_2$ removal without incurring intensive energy input to drive the pumps for scrubbing systems. For example, a marine engine fuelled by HFO with 3.5 wt % sulphur, every 1 MWh of brake power produced requires at least 171 $m^3$ of seawater to capture and neutralize the $SO_2$ from exhaust gas. The huge amounts of seawater has to be pumped, contacted with flue gas and then treated after scrubbing, and as a result these processes require large and costly equipment when installed onboard a ship where space limitation and retrofitting are major concerns.

NOx Removal

The limit of $NO_x$ emissions from ships is regulated under Annex VI and applies to the emission from diesel engines with a power output of greater than 130 kW. The most stringent standard is applied to ships with a keel-laying date on or after 1 Jan. 2016 operating in ECA. This standard represents around 80% less of $NO_x$ reduction from the $NO_x$ emission from most engines currently used worldwide.

To comply with the requirement, two major techniques can be applied and they are namely engine modification and post-combustion treatment. It is unlikely that the engine modification can be a stand-alone technique to facilitate the $NO_x$ reduction to meet the IMO requirement. For post-combustion treatment, selective catalytic reduction (SCR) seems to be the only dry method currently employed to assist the ship owners to meet the IMO requirement. However, there are several drawbacks of SCR and these typically include catalyst poisoning by the presence of $SO_2$ in flue gas, its complicated operation and ultimately its cost. To address these issues, a robust and self regenerative process for onboard $NO_x$ removal is desirable.

Ballast Water Management

The transport of ballast water containing aquatic organisms can also cause a serious environmental threat to the world's oceans and sea. The spreading of invasive species results in irreversible damage to biodiversity and the valuable natural resources.

Under the International. Convention for the Control and Management of Ships' Ballast Water and Sediments, IMO regulations require all newly built vessels to comply with ballast water treatment standards from Year 2009 or Year 2011 depending on ship size. By Year 2016, compliance with these new standards will be compulsory for all vessels.

In general, the ballast water treatment can be divided into two steps, i.e. solid-liquid separation and disinfection. Solid-liquid separation is utilized for the separation of solid material, including large suspended microorganisms from ballast water prior to undergoing disinfection.

Disinfection removes and/or deactivates microorganisms. There are various disinfection techniques, i.e. physicochemical disinfection (e.g. ultraviolet light) and chemical disinfection (e.g. ozonation, chlorination and electrochlorination). The application of ultraviolet is limited by the turbidity of ballast water. Chemical disinfection is an attractive technique in comparison with physicochemical disinfection.

US 2004/0099608A1 (Leffler et al.), US 2004/6773611B2 (Perlich et al.), US 2007/7244348 B2 (Fernandez et al.) disclose systems and apparatuses for ballast water treatment to remove contaminants from ballast water on a vessel using disinfectants generated from electrolysis of saltwater. The ballast water may be disposed overboard after being treated.

The disinfectant include chlorine ($Cl_2$), bromine ($Br_2$) and other halides, hypochlorite ($ClO^-$), chlorine dioxide ($ClO_2$), hydrogen peroxide ($H_2O_2$) or other disinfectants into ballast water. Chlorine is a primary disinfectant that has been widely used in water treatment industry. Chlorine can be generated from electrolysis of saltwater and seawater. At the same time, alkaline substances, including sodium hydroxide (NaOH) is also generated as another product.

PAJ 52-128886 (1977) discloses a method to prevent the sticking of microorganism in seawater, by equipping the seawater electrolyzer in the ship and carrying out desulfurization by supplying NaOH gained from the above electrolyzer, to the scrubber cooling water, together with supplying $Cl_2$ generated from the above equalizer and from the electrolyzer, to the piping of seawater system.

According to above said demand on marine emission control ($SO_2$ and NOx removal) and ballast water treatment technology, improvements to overcome the drawbacks of current technologies while complying with forthcoming regulations on emissions and ballast water are highly desirable.

SUMMARY OF INVENTION

Embodiments of the invention relate to a system and aspects thereof which can be applied for: (1) efficient treatment of exhaust gas generated from fuel combustion; and/or (2) effective disinfection of water containing microorganisms.

The system involves the processes for $SO_2$, $NO_x$ and PM removal and the process for water disinfection with the exploitation of electrochemical techniques to control oxidation-reduction potential (ORP) and pH of media used in the processes.

The system involves the processes for alkalinity enhancement of seawater by alkaline substance dosing and scale prevention during the SOx removal process. The system has to be independent on seawater alkalinity and the footprint has to be small. In the present invention, it is realized that seawater alkalinity is able to reach 2,300~16,100 µmol/kg without causing scaling problem if alkaline substances are carefully selected, dosed properly and the absorption of $SO_x$ is complete. As a result, the scrubbing system will require much less energy to run due to the markedly reduced seawater flow, and as an additional benefit, the back pressure of the scrubber is reduced.

The present invention has alleviated the major drawbacks of seawater scrubbing for $SO_x$ removal by alkaline substance dosing into either scrubbing seawater or post neutralization step of spent acidic sea water to reduce the amount of sea water required and hence the energy consumption. At mean time the dosing and scrubber operation are controlled in a way that all the initial metastable precipitation are dissolved by the acidity from $SO_x$ containing exhaust gas.

With the exploitation of electrochemical technique, the system can also be applied to water disinfection in addition to $SO_x$ removal. The main medium used in the process includes, but are not limited to, seawater, brine water, brackish water, and seawater containing salt (NaCl) and freshwater containing salt (NaCl).

Embodiments of the invention provide reliable, environmentally sound and effective solutions for industries to comply with local and international regulations and/or to meet their own requirements for the production processes in terms of gaseous emissions and treatment of water containing microorganisms.

DETAILED DESCRIPTION

Figure 1:
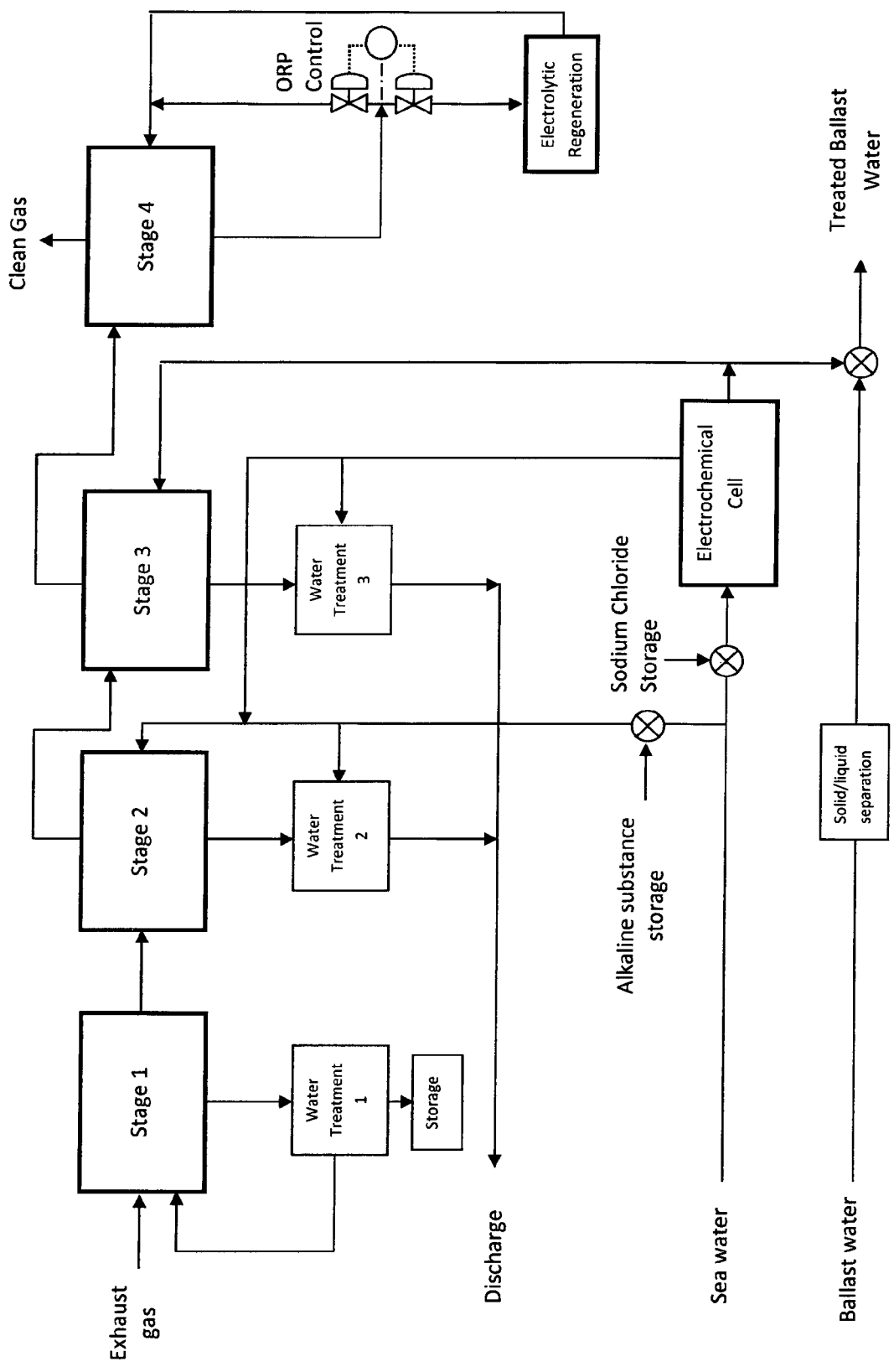
FIG. 1 shows an overall process of PM, $SO_x$, $NO_x$ and ballast water treatment.

According to one embodiment of the invention, a system includes exhaust gas treatment and/or ballast water treatment. The wet scrubbing technique is used in exhaust gas treatment. In exhaust gas treatment, there are four stages: (1) PM removal; (2) $SO_x$ removal; (3) NO conversion; and (4) $NO_2$ removal. The schematic diagram according to one embodiment of the invention is illustrated in FIG. 1.

Particulate matter (PM) is removed in Stage 1, which relies on a closed-loop system for physical separation of particles from gas. The exhaust gas containing $SO_x$, $NO_x$, $CO_2$ and PM flows into the particulate removal device and the PM is trapped in the medium used in the system. The medium used is in a liquid phase and it includes but not limited to freshwater and seawater. After the PM removal from the exhaust gas, the used medium. i.e. wastewater or liquid containing PM, obtained from the particulate removal device is then passed to the filtration unit for wastewater treatment. The PM is filtered out from the used medium i.e. wastewater and the regenerated medium, i.e. treated water is re-circulated back into the particulate removal device. The PM sludge from the filtration unit is collected in a waste drum to further dispose off onshore.

SOx Removal Process

Stage 2 is used for the removal of $SO_x$ by neutralization technique using seawater and/or processed water. In case seawater is used as a scrubbing agent, the removal of $SO_x$ is mainly governed by the alkalinity of seawater and the removal mechanisms are as follows:

$$SO_2(g) \longleftrightarrow SO_2(aq) \tag{1}$$

$$SO_2(aq)+2H_2O(l) \longleftrightarrow HSO_3^-(aq)+H_3O^+(aq) \tag{2}$$

$$HSO_3^-(aq)+H_2O(l) \longleftrightarrow SO_3^{2-}(aq)+H_3O^+(aq) \tag{3}$$

$$HCO_3^-(aq)+H_3O^+(aq) \longleftrightarrow CO_2(aq)+2H_2O(l) \tag{4}$$

$$CO_2(aq) \longleftrightarrow CO_2(g) \tag{5}$$

Instead of seawater, processed water such as sea water enhanced with alkaline substance dosing and/or sea water or brine water from electrochemical cell with enhanced alkalinity can also be used as a scrubbing agent.

In the present invention there are three ways to enhance the alkalinity of scrubbing water to increase its absorption capacity of $SO_x$.

1) Direct Dosing of Alkaline Additive Substances to Sea Water, Brine Water and Fresh Water In general, natural seawater with salinity number 35 contains 0.0528 mol/kg of dissolved $Mg^{2+}$ and 0.0103 mol/kg of $Ca^{2+}$. Evaporation and increase in alkalinity will cause them to precipitate, however, only when $CaSO_4$ begins to precipitate does the permanent scale form. A shock dose of alkaline additive substance to seawater may cause temporary fine particles of $Mg(OH)_2$ and $CaCO_3$ to precipitate. However, the presence of a continuous acidic component ($SO_2$) from exhaust gas will eventually bring the suspended particles back to dissolved form and no scale will be left. In present disclosure, the alkalinity of the input scrubbing water is enhanced to several pre-determined values by direct dosing of alkaline additive substances, the amount of dosing is controlled either by comparing the differences between a pre-loaded input water alkalinity map from varies geological locations with the set value or by the immediate feedback from a sensor such as, but not limited to salinity and pH meters. And accordingly, the $SO_x$ removal can be operated at an appropriate pH range to prevent scale from depositing after sea water is enhanced by the controlled dosing.

Exhaust gas flows through a wet scrubber in full contact with scrubbing agent. Seawater is used as the matrix of scrubbing agent, into which at least one suitable alkaline additive substance is added to enhance the alkalinity of the seawater. The suitable substance can be chosen from alkaline metal compounds or alkaline earth metal compounds, where the compounds are oxides, hydroxides, bicarbonates, carbonates sulphites or silicates. More preferably, the alkaline additive substance is selected from caustic soda (NaOH), sodium bicarbonate ($NaHCO_3$), sodium carbonate ($Na_2CO_3$), lime ($Ca(OH)_2$), limestone ($CaCO_3$), magnesium oxide (MgO), magnesium carbonate ($MgCO_3$) or magnesium hydroxide ($Mg(OH)_2$).

The alkaline additive substance is introduced in fully dissolved form or mixed as colloidal suspension or in slurry form into the seawater by any means of mechanical mixing to ensure homogeneity of the alkalinity enhanced seawater. As a result of dosing, the initial feed seawater appears either milky or colloidal due to the metastable precipitation or the presence of very fine colloidal particles. The mixing is performed at the scrubbing seawater inlet, or inside the packing section of scrubber, or at the bottom sump of the scrubber.

Immediately after the mixing, the alkaline seawater, which has a pH ranging from 8 to 12, is introduced into the scrubbing stage where capturing and neutralization of $SO_2$ take place. Due to the enhanced strength (alkalinity) of the seawater, the amount of seawater to achieve the same removal percentage as that of a natural seawater scrubber is drastically reduced, thus saving more energy in pumping the seawater.

Besides the contribution from the bicarbonate alkalinity from seawater, the added alkaline additive substances simultaneously capture $SO_2$ by the following reactions:

$$MOH + SO_2 \rightarrow MHSO_3 \quad (6)$$

where M is alkaline metal.

$$M(OH)_2 + 2SO_2 \rightarrow M(HSO_3)_2 \quad (7)$$

$$MO + 2SO_2 + H_2O \rightarrow M(HSO_3)_2 \quad (8)$$

$$MCO_3 + 2SO_2 + H_2O \rightarrow M(HSO_3)_2 + CO_2 \quad (9)$$

where M is alkaline earth metal.

It is preferable to use sodium hydroxide or magnesium hydroxide slurry (magnesia milk) as additive substance because the reaction products (i.e. bisulfite) are soluble and free from deposition, scaling and plugging problems. The enhanced seawater is utilized in either open-loop or closed-loop configuration until pH of scrubbing water drops to 3.5~6.8.

In another embodiment of the present invention, a fraction of alkaline seawater, fresh seawater, alkaline additive substances or their combination thereof are added to neutralize the spent acidic scrubbing water to bring the pH back to neutral or as alkaline as the input natural seawater, which is not achievable by conventional open loop seawater scrubbing technology.

2) Electrochemical Treatment to Increase the Alkalinity of Sea Water, Brine Water and Fresh Water Dosed with Salt (Sodium Chloride).

Instead of storing alkaline additive substances on board ships, they can be alternatively generated in-situ by utilizing an electrochemical cell. By this method, the ballast water can also be treated when necessary.

The processed seawater produced from the cathode side of electrochemical cell is a solution with high pH value (ranging from around 8 to around 12) by reactions 10 to 13. The processed seawater contains but not limited to sodium hydroxide (NaOH), magnesium hydroxide, ($Mg(OH)_2$), potassium hydroxide (KOH) and calcium hydroxide ($Ca(OH)_2$). In the wet scrubber, $SO_2$ is captured in the processed seawater by neutralization.

$$2NaCl + 2H_2O \rightarrow 2NaOH + H_2 + Cl_2 \quad (10)$$

$$2KCl + 2H_2O \rightarrow 2KOH + H_2 + Cl_2 \quad (11)$$

$$MgCl_2 + 2H_2O \rightarrow Mg(OH)_2 + H_2 + Cl_2 \quad (12)$$

$$CaCl_2 + 2H_2O \rightarrow Ca(OH)_2 + H_2 + Cl_2 \quad (13)$$

After the scrubbing agent has been used for $SO_x$ removal, it produces wastewater with a low pH and a low oxidation-reduction potential (ORP) due to $SO_3^{2-}$ generation. The pH of the used scrubbing agent is adjusted (as necessary) using a fresh supply of the scrubbing agent e.g. processed seawater containing alkaline additive substances. After adjusting pH, the treated wastewater has a pH value of greater than 6.5. The treated wastewater can be directly discharged to the sea or the ocean with a negligible effect to the marine environment and to the natural cycle of sulfur and carbon.

3) Integrated SOx Removal Process

Figure 4:
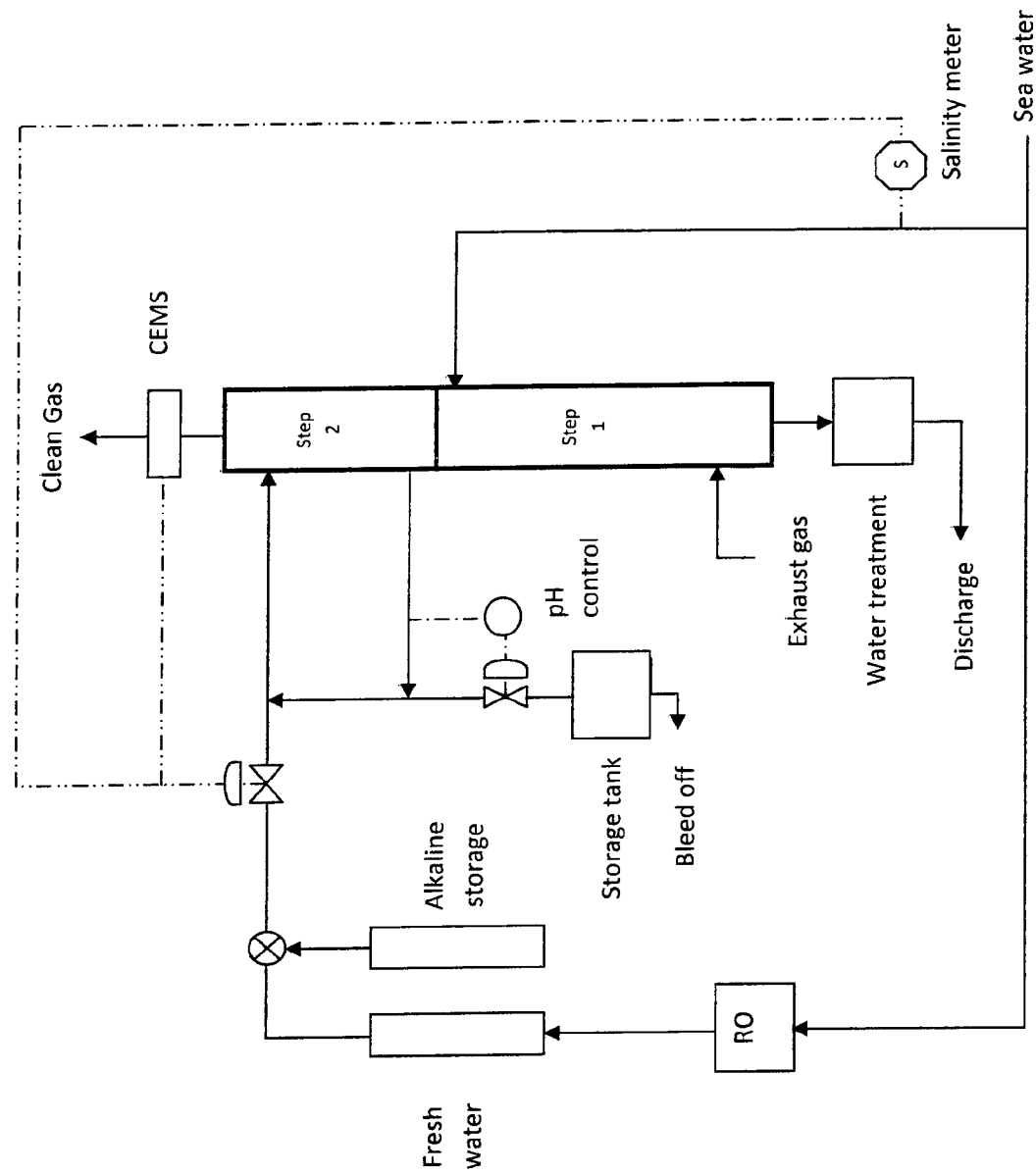
FIG. 4 shows a two-step $SO_x$ removal process including a combination of open-loop and closed-loop.

Alternatively, $SO_x$ can also be removed in Stage 2 using a two-step neutralization technique (as shown in FIG. 4). The two-step neutralization is a combination of an open-loop and a closed-loop system. The two-step neutralization can be achieved in a single scrubber or in separate scrubbers.

In an open-loop process of Step 1, the exhaust gas after the PM removal in Stage 1 flows from the bottom of a wet scrubber whereby seawater is used as a medium. As mentioned previously, the $SO_x$ removal is governed by the alkalinity of seawater and the removal mechanisms are expressed in Equations (1) to (5). The seawater obtained after $SO_x$ removal in the open-loop is treated by neutralization and aeration. The treated-seawater with a pH of around 7 to around 8 and contains mainly of $SO_4^{2-}$ can be directly discharged to the sea or the ocean with a negligible effect to marine environment and join the natural cycle of sulphur and carbon.

In the open-loop process of Step 1, the salinity of inlet seawater is measured and this is correspondent to its alkalinity. In case that the alkalinity of seawater obtained is less than a setting point or predetermined level (e.g. 2.2 mmol L$^{-1}$), signal is sent to trigger the additional operation of the closed-loop process.

The closed-loop process of Step 2 is used for the removal of the remaining $SO_2$ present in the exhaust gas obtained from the open-loop seawater scrubbing. It can be operated either in the upper part of the same scrubber used in the open-loop process or in a separate scrubber after the open-loop process. The closed-loop consists mainly of a storage tank of alkaline substances and a storage tank of freshwater, the exhaust gas and scrubbing agent contacting area in the wet scrubber and a storage tank for used scrubbing agent. The scrubbing agent used in this step of the invention includes but not limited to high pH solutions (pH~around 8 to around 12). Optionally, a reverse osmosis (RO) unit is used in the present invention to produce freshwater either from seawater or from the used scrubbing agent collected in the storage tank.

Under the normal operation of the closed-loop (i.e. the salinity of seawater used in the open-loop is higher than the setting point), the exhaust gas containing only a trace amount of $SO_2$ flows to the scrubber. The $SO_2$ is captured in the form of $SO_3^{2-}$ by neutralization with the alkaline solution. After the scrubbing process, the pH of the used scrubbing agent is measured. In case its pH is still sufficiently high, the used scrubbing agent is circulated back into the scrubber.

The pH of the used scrubbing agent drops noticeably when the exhaust gas contains a higher amount of $SO_N$. This scenario takes place due to the low alkalinity of seawater used in the open-loop. As mentioned previously, the sensor is installed at the seawater inlet of the open-loop process of Step 1 to monitor the level of salinity of seawater obtained. When the salinity of seawater obtained is lower than the setting point, the signal is sent to trigger the additional operation of the closed-loop. In this case, the additional amount of the scrubbing agent with the pH of around but not limited to 8-12 is fed into the wet scrubber to capture the $SO_2$ remaining in the exhaust gas. The used scrubbing agent with a low pH level is sent to the wastewater storage tank. Optionally, the used scrubbing agent is treated using pH adjustment and aeration prior to storing in the wastewater storage tank.

Figure 2:
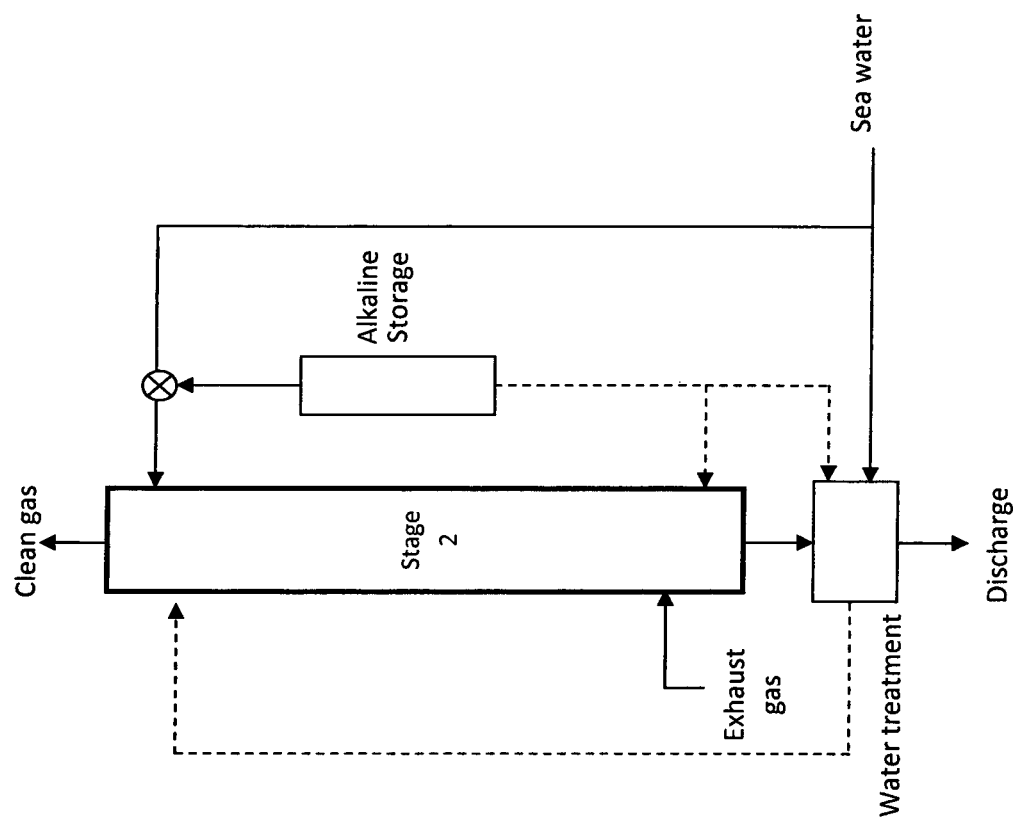
FIG. 2 shows an embodiment of $SO_x$ removal process by direct alkaline additive substance dosing.
Figure 3:
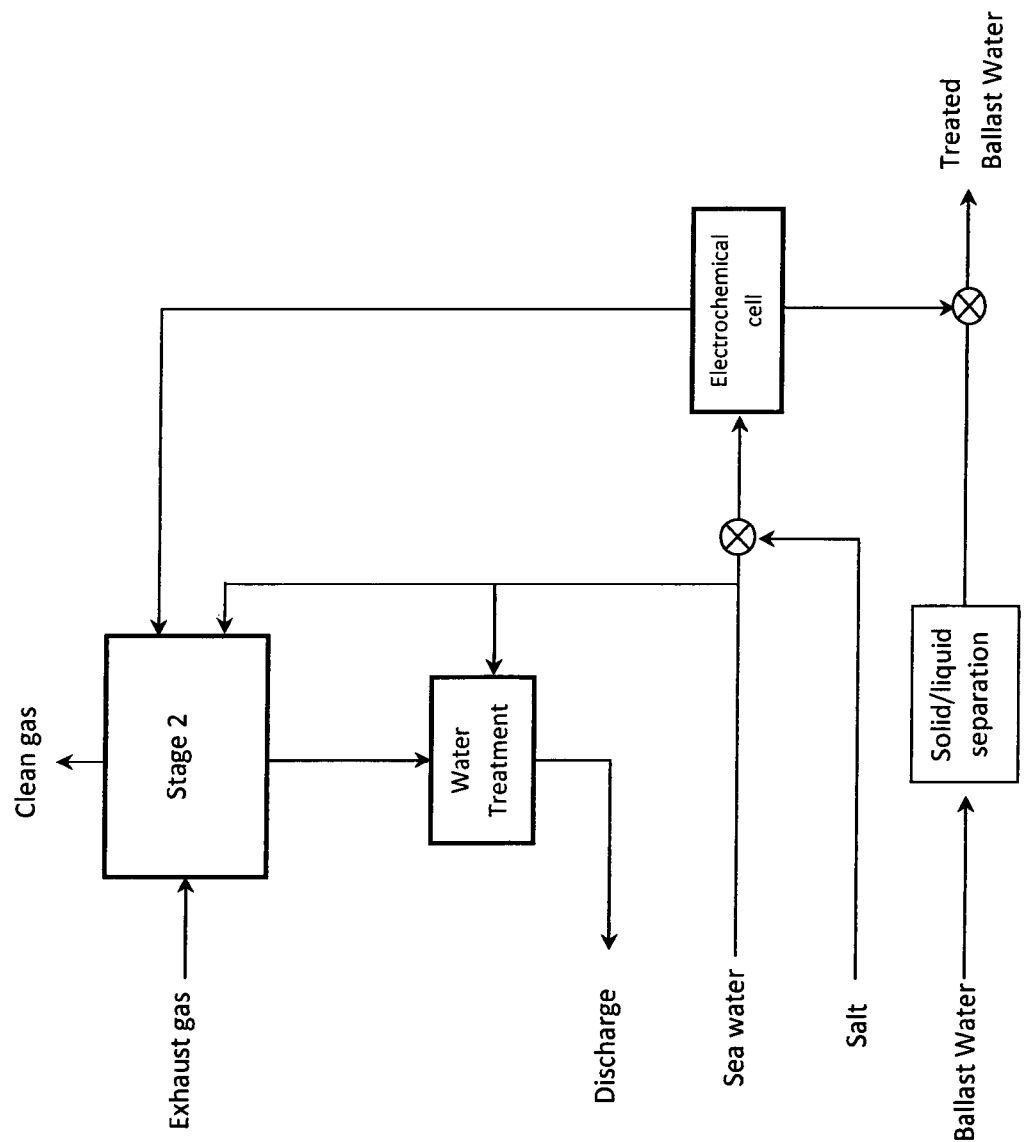
FIG. 3 shows one embodiment of $SO_x$ removal combined with ballast water treatment process.

Alternative to monitoring the level of salinity of seawater at the inlet of the open loop process of Step 1, the $SO_2$ monitoring system may be installed at the outlet of the exhaust gas obtained from the closed-loop process of Step 2. Once the $SO_2$ level in the exhaust gas is higher than a setting point or predetermined level, the signal from the $SO_2$ monitoring system is sent to trigger the additional operation of the closed-loop for $SO_2$ removal. In certain embodiments (e.g. FIG. 2), monitoring the level of salinity of seawater at the inlet of the open loop process of Step 1 and monitoring $SO_2$ at the outlet of the closed-loop process of Step 2 may be provided.

The used scrubbing agent obtained from $SO_x$ removal is treated before being discharged to marine environment. The oxidation-reduction potential (ORP) of the used scrubbing agent can be adjusted using aeration and/or oxidizing. The pH of the used scrubbing agent can be adjusted as necessary by neutralization with the alkaline additive substances directly, or those generated from the electrochemical cell and/or by dilution with seawater.

Ballast Water Treatment Process

The chemicals generated from the electrochemical cell can be used simultaneously in the system for $SO_x$ removal and ballast water treatment. The alkaline substance can be used for the neutralization of $SO_x$ contained in the exhaust gas and optionally for the treatment of used scrubbing agent after $SO_x$ removal as mentioned earlier. The oxidizing agent generated from the cathodic side of the electrolysis cell, in particular, chlorine ($Cl_2$), can be used for, but not limited to, the treatment of ballast water, the treatment of used scrubbing agent obtained from $SO_x$ removal and/or the final-step treatment of sewerage produced on-board ships.

Alternatively, the chemicals generated from the electrochemical cell can be collected and stored for further applications. The oxidizing agent produced at the anode side, in particular, chlorine ($Cl_2$) can be stored using several methods and they are as follows: (1) dissolve chlorine in ballast water tank (Equation 14); (2) liquid chlorine in cylinder, and (3), sodium hypochlorite (NaClO) by mixing chlorine ($Cl_2$) with sodium hydroxide (NaOH) generated at the cathode of the electrochemical cell (Equation 15). The sodium hypochlorite is kept in a liquid form and can be used further for ballast water treatment when required.

The hydrogen gas ($H_2$) produced at the cathode side can be stored for further uses such as, but not limited to, a clean fuel for heating, electricity and power generation.

$$Cl_2 + H_2O \leftrightarrow HCl + HClO \quad (14)$$

$$Cl_2 + 2NaOH \rightarrow NaCl + NaClO + H_2O \quad (15)$$

The present invention can be utilised for disinfection of water and wastewater including but not limited to ballast water treatment. In this component of the present invention, the system consists of two main parts, i.e. filtration and chemical dosing system. There are two filters, i.e. coarse and fine filters to remove organisms larger than 40-50 μm.

Microorganisms in water are oxidized by dosing the oxidizing agent generated from the same electrochemical cells used for the chemical generation in the process of the NO oxidation. The sufficient mixing of water to be treated with chemicals provides the elimination of microorganisms in water or aquatic invasive species (AIS) in ballast water. The control system monitors the chemical dose level to provide the desired efficiency. The chemical dosing level is variable and depends on water conditions, i.e. physical, chemical, and biological characteristics.

The chemical dosing level is variable and depends on water conditions, i.e. physical, chemical, and biological characteristics. Prior to discharge, post-treatment to remove any residual oxidizing agent, in particular, chlorine, is required if the concentration of residual chlorine exceeds an acceptable level (e.g. 2 ppm).

NOx Removal Process

Stage 3 (FIG. 1) is used for the pre-conversion of the exhaust gas containing $NO_x$ prior to the final stage of $NO_2$ removal. The exhaust gas obtained from Stage 2 contains $NO_x$ mainly in the form of nitrogen monoxide (NO). The pre-conversion promotes the overall removal efficiency of the $NO_x$ and favours the reaction towards more environmental friendly species.

The exhaust gas flows further to the wet scrubber where a high ORP condition is optimized for NO conversion into $NO_2$. In the wet scrubber, NO is oxidised using the medium generated at the anodic side of the same electrochemical cell used to produce processed water. The medium with a high ORP value generated from the electrochemical cell used for NO oxidation includes but not limited to chlorine ($Cl_2$), chlorine dioxide ($ClO_2$), and hydroxyl radicals (.OH). The example of the mechanisms is as follows:

$$NO(g) + Cl_2(g) + H_2O \rightarrow NO_2(g) + 2HCl(aq) \quad (16)$$

Depending on the medium dosing, the amount of NO conversion can be adjustable in accordance with the requirement of percentage of $NO_x$ emission reduction. This process also produces wastewater with a low pH value containing substances such as hydrochloric acid as a by-product. The pH of wastewater is adjusted using processed seawater generated from the electrochemical cell to be around 7-8 and the hydrochloric acid is converted back into its original species of chloride naturally occurring in seawater, i.e. sodium chloride (NaCl). Therefore, the treated wastewater can be discharged without any adverse effect to the marine environment.

$$HCl(aq) + NaOH(aq) \rightarrow NaCl(aq) + H_2O \quad (17)$$

Stage 4 (see FIG. 1) is a closed-loop process used for the conversion of $NO_2$ to $N_2$. It comprises a wet scrubber, a regeneration unit and an ORP control system. The exhaust gas containing $NO_2$ and (in some cases) NO flows to the wet scrubber where a low ORP environment is created to facilitate the reduction of $NO_2$ into $N_2$. The low ORP environment is created using a reducing agent such as but not limited to sodium sulfite ($Na_2SO_3$), sodium thiosulfite ($Na_2S_2O_3$) and sodium sulphide ($Na_2S$). A pre-calculated amount of reducing agent is initially required and dosed into the system during the start-up period of the system. Regardless of the types of reducing agents used in the scrubber, $NO_2$ is reduced into $N_2$. If $Na_2SO_3$ is used as a scrubbing agent, $SO_4^{2-}$ is produced as by-product.

$$2NO_2(g) + 4Na_2SO_3(aq) \rightarrow N_2(g) + 4Na_2SO_4(aq) \quad (18)$$

In general, side reactions can possibly take place and these result in the conversion of $NO_2$ to nitrite ions ($NO_2^-$) and nitrate ions ($NO_3^-$). These two types of ions are undesirable as they result in algae bloom in water body. However, this can be avoided by controlling the ORP condition of the system to an appropriately low level. With the appropriate control of the ORP condition, the scrubbed water will contain negligible harmful substance to marine environment.

$$2NO_2(g) + H_2O \rightarrow HNO_2(aq) + HNO_3(aq) \quad (19)$$

To ensure low ORP condition in the system, the key factor is that the scrubbing agent must contain an excess amount of reducing agent in comparison with the amount of $NO_2$ to be removed. After the reduction of $NO_2$ into $N_2$, the ORP of the used scrubbing agent from the bottom of the scrubber is ascertained or measured using an ORP meter with control valves. In case the ORP of the used scrubbing agent is still sufficiently low, the used scrubbing agent is circulated back to the scrubber. In case the ORP of the used scrubbing agent from the scrubber is too high, it is allowed to flow further to a system for the regeneration.

The regeneration system includes but not limited to the processes such as electron transfers using electrochemical cells. The electrochemical cell consists of electrodes, i.e. anode and cathode, direct current power supply and ion exchange membrane. The scrubbing agent containing $SO_4^{2-}$ flow into the electrochemical cell and the regeneration of $SO_3^{2-}$ from $SO_4^{2-}$ takes place at the cathode. At the cathode of the electrochemical cell, $SO_4^{2-}$ is reduced to $SO_3^{2-}$. The example of the reduction reaction at the cathode for the regeneration of $SO_4^{2-}$ to $SO_3^{2-}$ is as follows:

$$SO_4^{2-} + 2H^+ + 2e^- \leftrightarrow SO_3^{2-} + H_2O \quad (20)$$

The example of the oxidation reaction at the anode to complete the circuit of the electrochemical cell used for the $SO_4^{2-}$ regeneration is as follow:

$$H_2O \leftrightarrow \tfrac{1}{2}O_2 + 2H^+ + 2e^- \quad (21)$$

The scrubbing agent containing $SO_3^{2-}$ regenerated from the electrochemical cell with a low ORP value is circulated back to the scrubber for $NO_2$ reduction to $N_2$. The closed-loop of scrubbing agent circulation (i.e. from the scrubber to ORP controller, to the electrochemical cell and to the scrubber again) takes place repeatedly for $NO_2$ removal and for $SO_3^{2-}$ regeneration. The regeneration system enables the ORP of the scrubbing agent to be sufficiently low due to a high $SO_3^{2-}$ concentration. Consequently, the complete reduction of $NO_2$ to $N_2$ is achieved.

Other embodiments will be apparent to those skilled in the art from consideration of the specification and practice of the invention. Furthermore, certain terminology has been used for the purposes of descriptive clarity, and not to limit the disclosed embodiments of the invention. The embodiments and features described above should be considered exemplary, with the invention being defined by the appended claims.

What is claimed is:

1. A process for removal of sulphur oxides from exhaust gas comprising the steps of:
   (a) providing a seawater;
   (b) enhancing a $SO_x$ adsorption capacity of the seawater to pre-determined levels by controlled dosing with at least one alkaline additive substances introduced from a storage of fresh alkaline additive onboard, and/or an alkaline solution produced from the cathode side of an electrochemical cell and/or their combination thereof to form an alkaline seawater with a pH ranging from 8 to 12; and
   (c) contacting an exhaust gas with the alkaline seawater as a scrubbing agent, to produce an exhaust with reduced content of sulphur oxides and a used scrubbing agent;
   wherein a pH of the used scrubbing agent is adjusted to a range of 6.5 to 9 by neutralization with alkaline additive substance, and/or the alkaline water from the cathode side of the electrochemical cell, and dilution with natural sea water; and
   wherein the alkaline additive substance used in step (b) is chosen from an alkaline metal compound or an alkaline earth metal compound, where the compound is one of hydroxides, carbonates, bicarbonates, oxides, sulphites and silicates.

2. A process according to claim 1, wherein the alkaline additive substance is dissolved in the seawater, or mixed as colloidal form or in slurry form in the seawater.

3. A process according to claim 1, wherein the alkaline additive substance is produced from seawater, seawater containing sodium chloride or fresh water containing sodium chloride using an electrochemical cell.

4. A process according to claim 3, wherein the sodium chloride supplied to the electrochemical cell is introduced from seawater, and/or sodium chloride storage onboard and/or their combination thereof.

5. A process according to claim 1, wherein the alkaline seawater contacts the exhaust gas in a scrubber as one-through or multiple recirculation configurations.

6. A process according to claim 3 further comprising the steps of: (a) passing a ballast water containing microorganisms through a solid-liquid separation unit; (b) introducing an oxidising agent generated from the anode side of the electrochemical cell into the treated ballast water resulting from Step (a); and (c) keeping the treated ballast water from Step (b) for a pre-determined time to eliminate the microorganisms contained.

7. A process according to claim 6, further comprising: prior to discharging the water resulting from Step (c), removing any residual oxidising agent thereof if a concentration of the residual oxidising agent exceeds 2 ppm.

8. A process according to claim 6, wherein the oxidising agent generated from the electrochemical cell is one of chorine, chlorine dioxide and hydroxyl radical.

9. A two-step neutralization process for removal of $SO_x$ comprising the steps of:
  (a) passing an exhaust gas containing $SO_x$ to an open-loop first step neutralization in a first wet scrubber to contact the $SO_x$ with a first scrubbing agent;
  (b) adjusting a pH of the used first scrubbing agent with a fresh supply of processed water from an electrochemical cell;
  (c) adjusting an oxidation-reduction potential (ORP) of the used first scrubbing agent, after having adjusted the pH, by aeration;
  (d) after the open-loop first step neutralization, passing the exhaust gas containing $SO_x$ remaining from Step (a) to a closed-loop second step neutralization in the upper part of the first wet scrubber or in a second wet scrubber to contact the $SO_x$ with a second scrubbing agent;
  (e) ascertaining whether the pH of the used second scrubbing agent exceeds a predetermined pH value;
  (f) circulating the used second scrubbing agent to the closed-loop second step neutralization if the pH of the used second scrubbing agent exceeds the predetermined pH value;
  (g) collecting the used second scrubbing agent in a wastewater storage tank if the pH of the used second scrubbing agent is lower than the predetermined pH value; and
  (h) monitoring the salinity of the first scrubbing agent in Step (a) and/or monitoring $SO_x$ concentration of the exhaust gas from Step (d) so that an additional operation of the closed-loop second step neutralization is triggered to remove a remaining $SO_x$ from the exhaust gas when the salinity of the scrubbing agent is below a first predetermined level and/or when the $SO_x$ concentration of the outlet exhaust gas exceeds the second predetermined level.

10. The process according to claim 9, wherein the scrubbing agent used in Step (d) is an alkaline solution or processed water produced from an electrochemical cell.

11. A closed-loop process for removal of $NO_x$ comprising the steps of:
  (a) passing an exhaust gas having $NO_x$ through a wet scrubber which includes a scrubbing agent having a high concentration of reducing agent for creating a low oxidation-reduction potential (ORP) condition in the wet scrubber;
  (b) measuring if the used scrubbing agent is capable of creating the low ORP condition for $NO_2$ reduction;
  (c) regenerating the used scrubbing agent in an electrochemical cell if it has insufficient low ORP for $NO_2$ reduction and
  (d) circulating the regenerated scrubbing agent back to the wet scrubber.

12. The closed-loop process according to claim 11, wherein the low ORP condition facilitates the reduction of $NO_2$ to $N_2$ for complete conversion of $NO_2$.

13. The closed-loop process according to claim 11, further comprising controlling the ORP condition for suppressing at least one side reaction, including oxidation of $NO_2$ to $HNO_2$ and $HNO_3$.

14. A process according to claim 11, comprising the steps of:
  (a) passing an exhaust gas containing $NO_x$ to a wet scrubber which includes a scrubbing agent having a high concentration of oxidizing agent for creating a high oxidation-reduction potential (ORP) condition for converting NO to $NO_2$; and
  (b) adjusting a pH of the used scrubbing agent by using processed seawater generated from an electrochemical cell before discharging the used scrubbing agent.

15. The process according to claim 14, wherein the high ORP condition in the wet scrubber facilitates the oxidation of NO to $NO_2$.

* * * * *